(12) United States Patent
Asarikuniyil et al.

(10) Patent No.: US 10,812,752 B2
(45) Date of Patent: *Oct. 20, 2020

(54) METHOD AND APPARATUS TO PRESENT MULTIPLE AUDIO CONTENT

(71) Applicant: The DIRECTV Group, Inc., El Segundo, CA (US)

(72) Inventors: Binny Asarikuniyil, Cerritos, CA (US); Hai Nguyen, Torrance, CA (US); Sudheer Bandela, Torrance, CA (US); Heather Truong, Anaheim, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/102,026

(22) Filed: Aug. 13, 2018

(65) Prior Publication Data
US 2018/0352187 A1 Dec. 6, 2018

Related U.S. Application Data

(63) Continuation of application No. 15/219,813, filed on Jul. 26, 2016, now Pat. No. 10,205,906.

(51) Int. Cl.
*H04N 5/60* (2006.01)
*H04N 21/81* (2011.01)
(Continued)

(52) U.S. Cl.
CPC ............ *H04N 5/607* (2013.01); *G10K 11/34* (2013.01); *H04N 21/439* (2013.01);
(Continued)

(58) Field of Classification Search
None
See application file for complete search history.

(56) References Cited

U.S. PATENT DOCUMENTS 7,804,972 B2 9/2010 Melanson et al.
7,885,721 B2 2/2011 Castillo et al.
(Continued)

OTHER PUBLICATIONS

Bruijn, Werner, "Making All the Right Noises: Shaping Sound with Audio Beamforming", 2013.
(Continued)

*Primary Examiner* — Samira Monshi
(74) *Attorney, Agent, or Firm* — Guntin & Gust, PLC; Mark Wilinski (57) ABSTRACT

Aspects of the subject disclosure may include, for example, identifying first and second users and identifying first and second locations of the first and second users in a presentation area, determining first and second media content associated with the first and second users where the first media content includes first audio content and first video content and where the second media content includes second audio content, presenting the first video content at a display device during a particular time period, adjusting the first audio content resulting in adjusted first audio content, presenting the adjusted first audio content directed to the first location during the particular time period, and presenting the second audio content directed to the second location during the particular time period. Other embodiments are disclosed.

20 Claims, 8 Drawing Sheets

(51) Int. Cl.
    *H04N 21/443* (2011.01)
    *H04N 21/439* (2011.01)
    *G10K 11/34* (2006.01)
    *H04S 7/00* (2006.01)
    *H04N 21/442* (2011.01)
    *H04N 21/434* (2011.01)
    *H04N 21/45* (2011.01)
    *H04N 21/431* (2011.01)
    *H04S 3/00* (2006.01)

(52) U.S. Cl.
    CPC ..... *H04N 21/4316* (2013.01); *H04N 21/4347* (2013.01); *H04N 21/4438* (2013.01); *H04N 21/44218* (2013.01); *H04N 21/4532* (2013.01); *H04N 21/8106* (2013.01); *H04N 21/8126* (2013.01); *H04S 7/303* (2013.01); *H04R 2205/041* (2013.01); *H04R 2225/55* (2013.01); *H04S 3/008* (2013.01); *H04S 7/304* (2013.01); *H04S 7/307* (2013.01)

(56) References Cited

U.S. PATENT DOCUMENTS

| | | |
|---|---|---|
| 7,970,153 B2 | 6/2011 | Konagai et al. |
| 8,031,891 B2 | 10/2011 | Ball et al. |
| 8,494,189 B2 | 7/2013 | Katayama et al. |
| 8,787,602 B2 | 7/2014 | Macours et al. |
| 8,823,782 B2 | 9/2014 | Karaoguz et al. |
| 9,049,508 B2 | 6/2015 | Puskarich |
| 9,219,967 B2 | 12/2015 | Nquyen et al. |
| 9,344,632 B2 | 5/2016 | Kanehide et al. |
| 2007/0011196 A1* | 1/2007 | Ball ................ H04H 60/45 |
| 2008/0028037 A1* | 1/2008 | Moyer ............. G06Q 10/10 709/217 |
| 2009/0172512 A1* | 7/2009 | Sakaguchi ......... H04N 5/44513 715/209 |
| 2009/0240360 A1 | 9/2009 | Dai et al. |
| 2012/0002025 A1 | 1/2012 | Bedingfield et al. |
| 2012/0038827 A1 | 2/2012 | Davis et al. |
| 2013/0322666 A1 | 12/2013 | Yoo et al. |
| 2014/0064526 A1* | 3/2014 | Otto .................. H04S 5/00 381/300 |
| 2014/0188455 A1 | 7/2014 | Manuselis et al. |
| 2014/0267905 A1 | 9/2014 | Lee et al. |
| 2014/0328505 A1 | 11/2014 | Heinemann et al. |
| 2014/0362201 A1 | 12/2014 | Nguyen et al. |
| 2015/0199089 A1 | 7/2015 | Lee et al. |
| 2015/0326963 A1 | 11/2015 | Sorenson |
| 2016/0149547 A1 | 5/2016 | Rider et al. |
| 2018/0035072 A1 | 2/2018 | Asarikuniyil et al. |

OTHER PUBLICATIONS

Lee, Ki-Seung et al., "A Real-Time Audio System for Adjusting the Sweet Spot to the Listener's Position", IEEE Transactions on Consumer Electronics, vol. 56, No. 2, May 2010, 835-843.

\* cited by examiner

METHOD AND APPARATUS TO PRESENT MULTIPLE AUDIO CONTENT

CROSS-REFERENCE TO RELATED APPLICATIONS

This application is a continuation of U.S. patent application Ser. No. 15/219,813 filed Jul. 26, 2016. The contents of the foregoing is hereby incorporated by reference into this application as if set forth herein in full.

FIELD OF THE DISCLOSURE

The subject disclosure relates to a method and apparatus to present multiple audio content.

BACKGROUND

Display devices have the capability of presenting multiple video content at the same time, such as through Picture-in-Picture (PIP) format, side-by-side format, and so forth. Viewers can choose to focus on the particular video content that they are most interested in viewing.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for presenting multiple audio content, such as corresponding to multiple video content being presented at a display device. In one or more embodiments, the audio content can be adjusted to facilitate presentation to a particular user that desires to hear the audio content.

In one or more embodiments, different audio content can be delivered to different speakers based on a selection criteria. For example, different audio content can be delivered to different speakers of a head-phone so that users can share the headphones. For instance, one or both audio content can be adjusted to facilitate hearing by the user, such as volume adjustment(s) if one audio content is interfering with listening by the other user that is attempting to hear the other audio content.

In one or more embodiments, a determination can be made as to where a particular user is sitting and what movie that particular user in watching (e.g., of the two movies being presented at a television). The corresponding audio for the movie being watched can be delivered to a speaker closest to the particular user. Various criteria can be used for determining what movie is being watched such as user input, position in a room, eye tracking, and so forth. In one or more embodiments, beam forming at the speaker can be implemented to direct the emitted audio to the particular user at a particular location in a room. In one or more embodiments, two or more audio contents can be presented when only one video content is being presented where the two audio contents can be related to the video such as different languages or can be unrelated such as one audio content being for the movie and a second audio content being of a sporting event for which video content is not being presented. Other embodiments are described in the subject disclosure.

One or more aspects of the subject disclosure include a device having a processor and a memory that stores executable instructions that, when executed by the processor, facilitate performance of operations. The processor can capture an image of a presentation area associated with a display device, where the image includes first and second users. The processor can identify the first and second users and can identify first and second locations of the first and second users, respectively, in the presentation area according to the image. The processor can determine first and second media content associated with the first and second users, respectively, where the first and second media content includes first and second audio and video content, respectively. The processor can present the first and second video content at the display device during a particular time period and can adjust the first audio content according to a comparison of subject matter associated with the first and second media content resulting in adjusted first audio content. The processor can present the adjusted first audio content directed to the first location during the particular time period. The processor can present the second audio content directed to the second location during the particular time period.

One or more aspects of the subject disclosure include a machine-readable storage medium, comprising executable instructions that, when executed by a processor, facilitate performance of operations, including identifying first and second users and identifying first and second locations of the first and second users, respectively, in a presentation area. The processor can determine first and second media content associated with the first and second users, respectively, where the first media content includes first audio content and first video content, and where the second media content includes second audio content. The processor can present the first video content at a display device during a particular time period and can adjust the first audio content resulting in adjusted first audio content. The processor can present the adjusted first audio content directed to the first location during the particular time period and can present the second audio content directed to the second location during the particular time period.

One or more aspects of the subject disclosure is a method that includes determining, by a processing system including a processor, first and second media content associated with first and second users, respectively, where the first and second media content includes first and second audio and video content, respectively. The method includes presenting, by the processing system, the first and second video content at the display device during a particular time period. The method includes adjusting, by the processing system, the first audio content resulting in adjusted first audio content, where the adjusting the first audio content is based on one of a comparison of the first and second media content, a first user profile of the first user, a second user profile of the second user, or any combination thereof. The method includes presenting, by the processing system, the adjusted first audio content at a first speaker of a headphones during the particular time period. The method includes presenting, by the processing system, the second audio content at a second speaker of the headphones during the particular time period.

Figure 1:
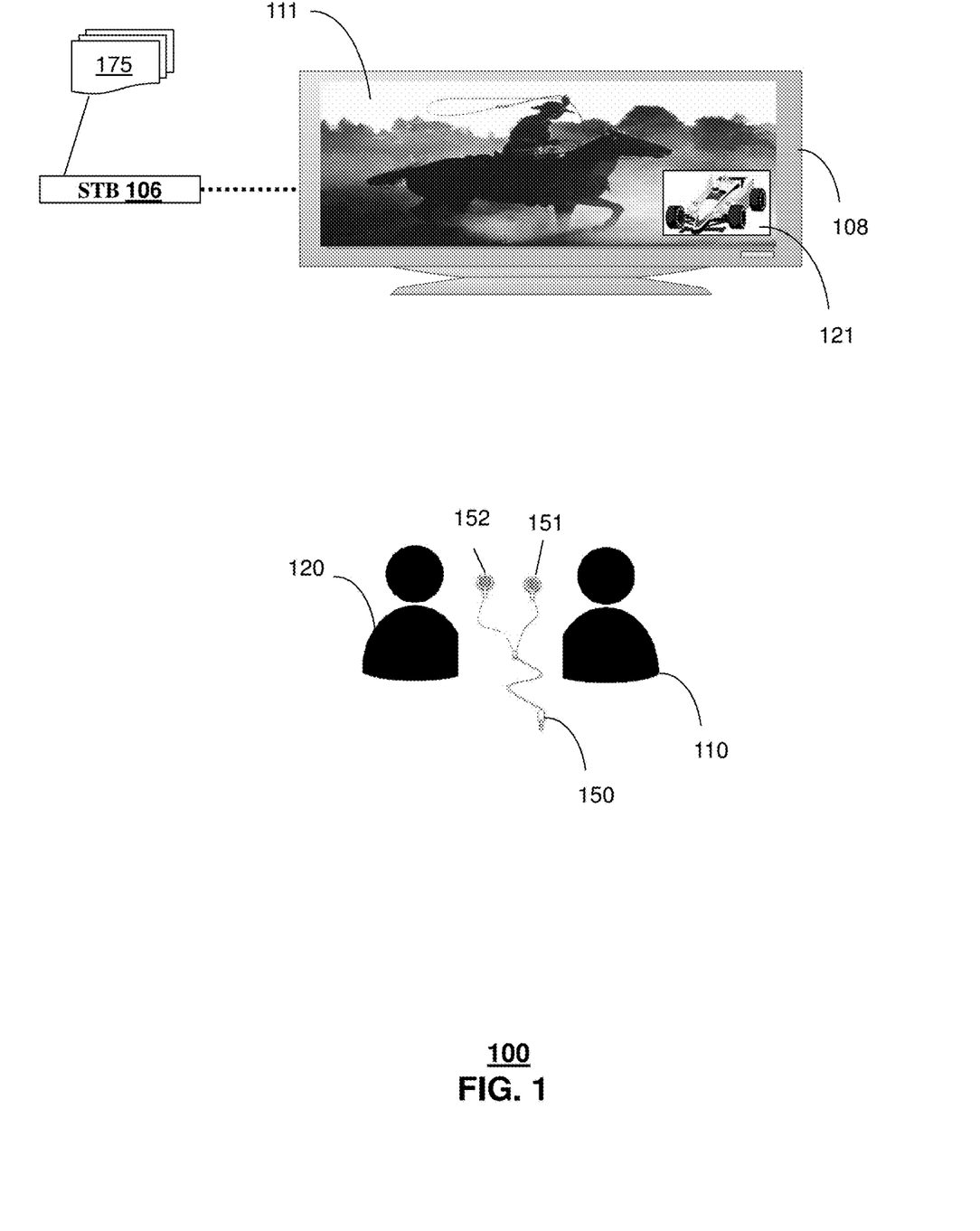
FIG. 1 depicts an illustrative embodiment of a system that provides for presentation of multiple audio content.

FIG. 1 depicts an illustrative embodiment of a system 100 that enables presenting multiple audio content that corresponds to multiple video content 111, 121 being presented by a media processor 106 (e.g., a set-top box (STB)) at a display device 108. System 100 illustrates the display device 108 as a television connected with the media processor 106, however, the presentation of the video and audio content can be at various types of devices, including a mobile phone, a laptop computer, a desktop computer, a vehicle entertainment system, and so forth. System 100 enables multiple users to view multiple video content while also listening to the corresponding audio content for that particular video content. The multiple video content 111, 121 is being presented in a PIP format, however, various other formats and techniques can be utilized, such as side-by-side format, a mosaic of more than two video contents, stereoscopic viewing utilizing synchronized viewing glasses (e.g., shutter glasses), and so forth. The exemplary embodiment illustrates two video contents and two corresponding audio contents, however, any number of media contents can be presented according to the capabilities of the media processor 106 and/or the display device 108.

In one or more embodiments, system 100 enables a determination (e.g., by the media processor 106) that first and second users 110, 120 desire to watch first and second video content 111, 121, respectively. The media processor 106 can present the first and second video content 111, 121 at the display device 108 during a particular time period and can deliver the corresponding audio content to audio devices that will separately present the audio content. In the illustrated example, head-phones 150 having right and left speakers 151, 152 can be utilized where the right speaker 151 receives audio content corresponding to the video content that user 110 is viewing and the left speaker 152 receives the audio content corresponding to the video content that the user 120 is viewing.

In one embodiment, one or both of the audio contents can be adjusted to facilitate presentation to the user. For example, the audio content can be adjusted based on a comparison of the first and second video and/or audio content. For instance, video content 111 can be a western movie with dialogue that is significant to user 110 for understanding the video content 111, while video content 121 is a race with loud motor sounds that are less important to the consumption of video content 121. In this example, an adjustment can be made to ensure that user 110 can clearly hear the audio content for video content 111 even if this means that user 120 does not hear the audio content for video content 121 as clear. For instance, the volume of the audio content for video content 111 can be increased and/or the volume of the audio content for video content 121 can be decreased. In one embodiment, the subject matter of each of first and second video contents 111, 121 can be determined and can be the basis of the comparison between the first and second video contents for adjusting corresponding audio content. The subject matter can be determined based on various techniques, such as analyzing metadata (e.g., included with a video stream) for the video content that describes the subject matter, accessing titles of the video content, accessing (e.g., locally and/or remotely) summaries of the subject matter, and so forth.

In one or more embodiments, audio adjustments can be performed based on user preferences, such as indicated in a user profile. For example, user 110 can indicate in a user preference that he or she requires a high volume of audio when watching a movie while user 120 can indicate in a user preference that he or she does not require a high volume of audio when watching sporting events. Based on one or both of these user preferences (e.g., included in user profiles 175 for the users 110, 120 stored by or accessible to the media processor 106), one or both of the audio contents corresponding to video contents 111, 121 can be adjusted. The adjustments to the audio content can be of various types which may or may not include volume adjustments, such as changing audio frequency including selective speech frequency amplification (e.g., a hearing aid implement via the media processor 106).

In one or more embodiments, the determination of which media content a particular user is viewing can be based on user input, such as indicating via a remote controller (or other technique for providing user input) the particular video content being watched and the particular speaker that is being listened to (e.g., speaker 151 or 152 of the head-phones 150).

Figure 2:
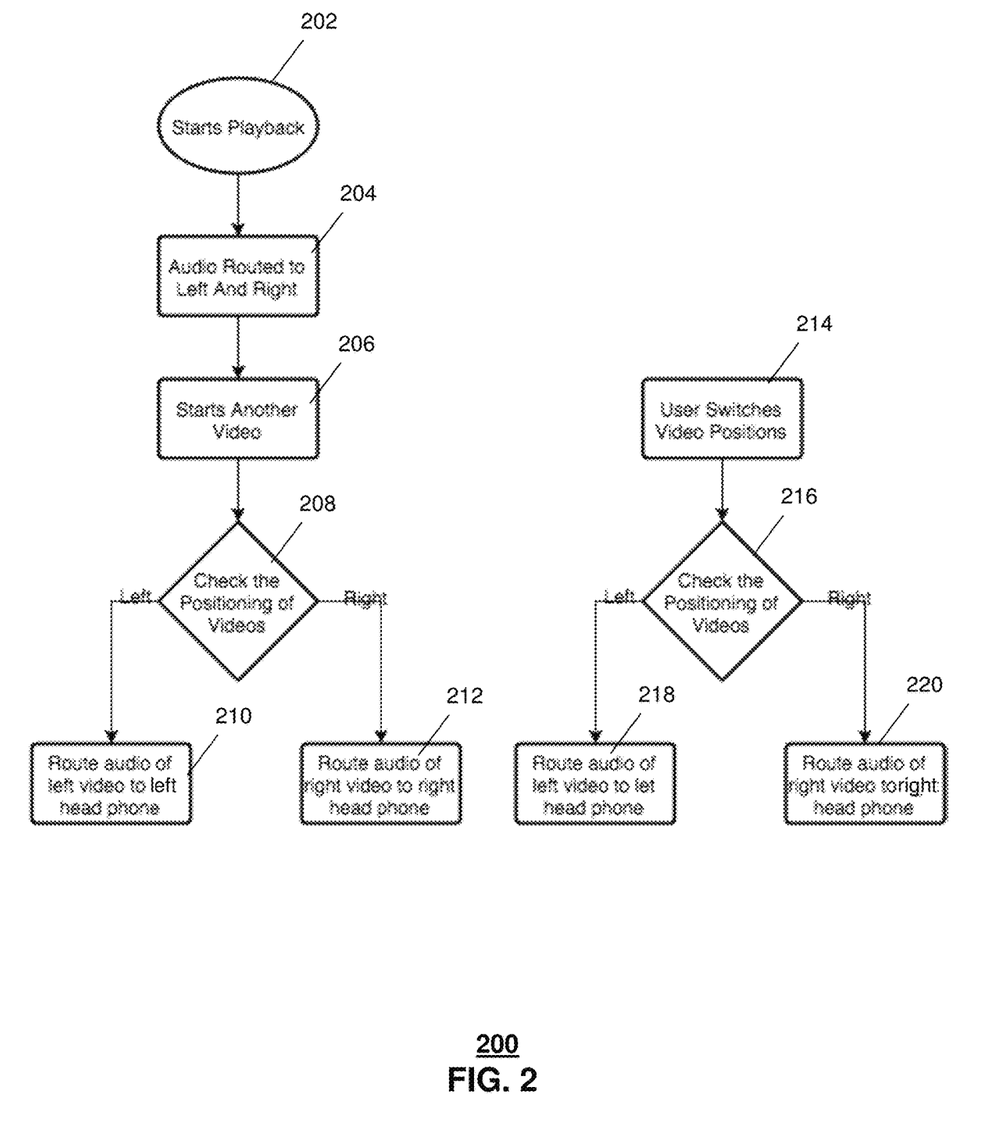
FIG. 2 depicts an illustrative embodiment of a method operating in the system of FIG. 1.

Referring to FIG. 2, a method 200 is illustrated for managing the delivery of multiple audio content. At 202, video content can be presented at a display device and the corresponding audio content can be routed to both speakers of a head-phone at 204.

Figure 3:
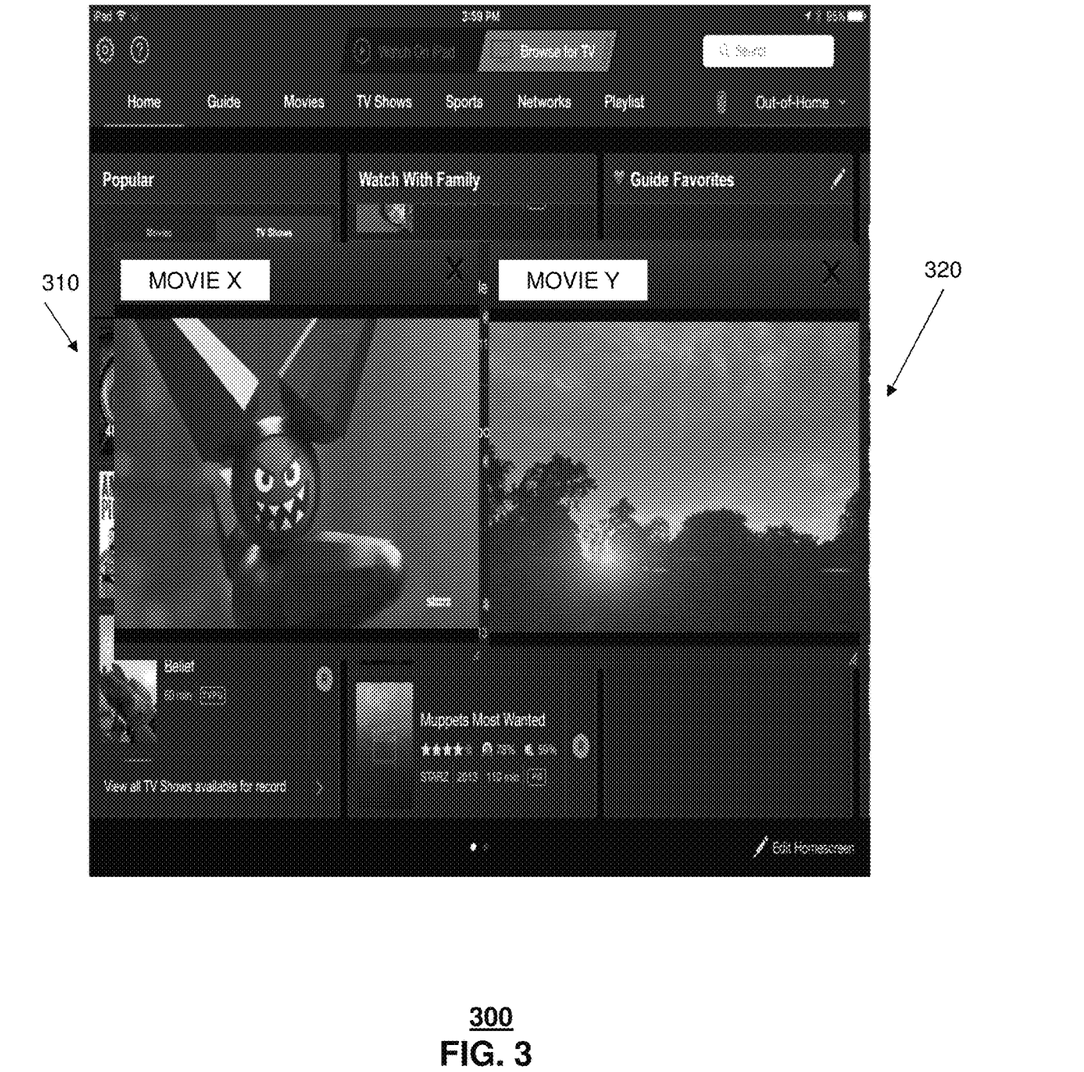
FIG. 3 depicts an illustrative embodiment of a graphical user interface that can be utilized during the method of FIG. 2.

At 206, other video content can be presented at the same display device. An audio routing determination can then be made, such as based on user input. In one embodiment, the presentation of the second video content at the display device can be automatically detected without user notification and user input for audio routing can be automatically sought from the user(s). Referring additionally to FIG. 3, a Graphical User Interface (GUI) 300 is illustrated that enables obtaining user input. In one embodiment, the GUI 300 can be automatically presented (or a notice of the availability of the GUI) responsive to detecting the second video content being presented. For example at 208, a position of the video content can be designated (e.g., manipulating a content icon, image or other indicia to appear at left position 310 or at right position 320) and the designation of that position determines routing of the corresponding audio content to a particular left or right speaker at steps 210, 212.

In the event that additional user input is received, such as moving the content icon, image or other indicia in the GUI 300 to appear at the other of the left position 310 or right position 320, then steps 214-220 enable adjusting the routing of the audio contents to different ones of the left or right speakers. In one embodiment, GUI 300 can be manipulated such that positions 310, 320 are both filled with the same content icon, image or other indicia in which case the same audio content can be routed to both the left and right speakers of the head-phones. In this example, one or both of the audio contents can be adjusted as described herein, such as routing the same audio content at different volumes to the left and right speakers of the head-phones.

Figure 4:
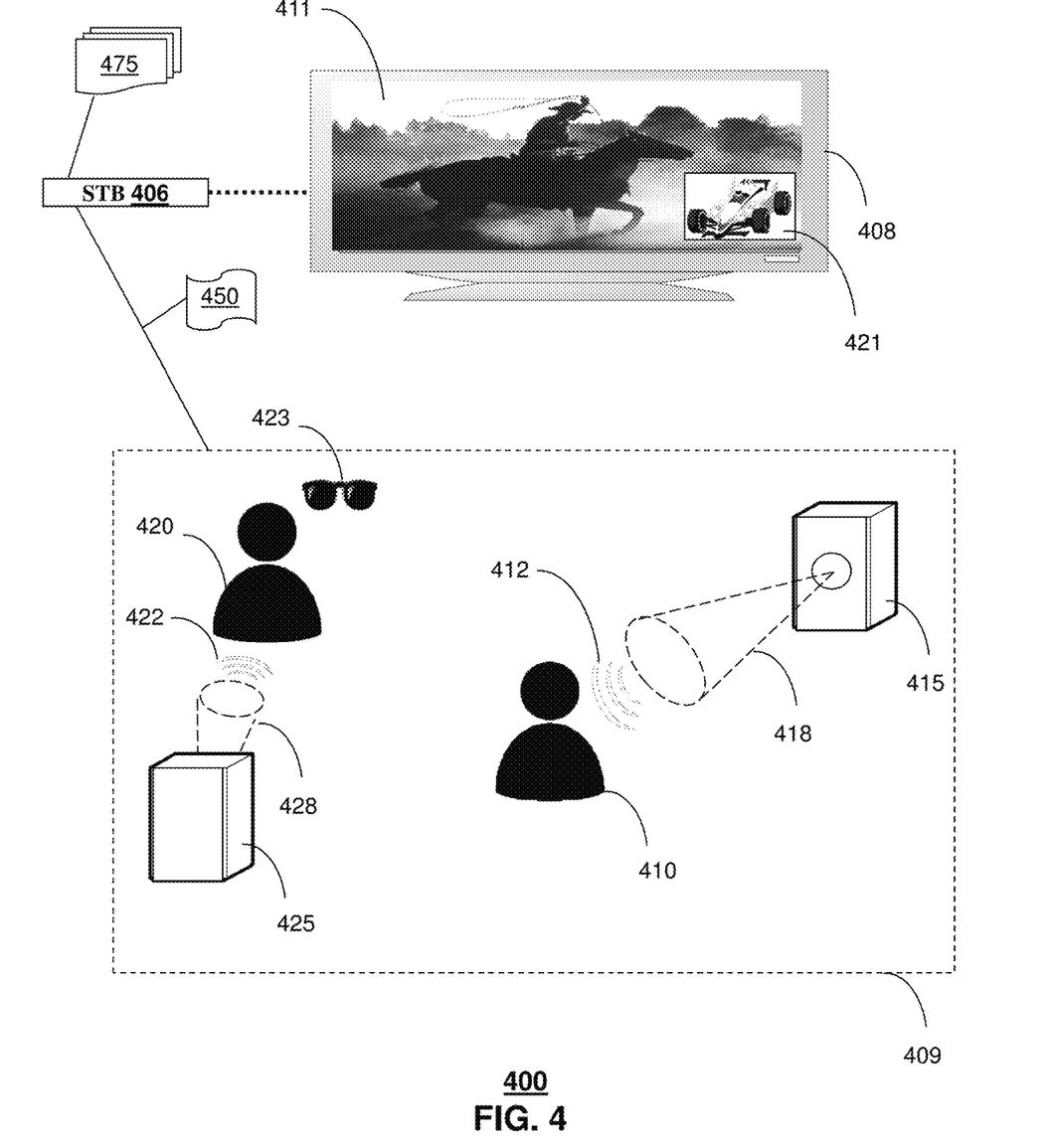
FIG. 4 depicts another illustrative embodiment of a system that provides for presentation of multiple audio content.

FIG. 4 depicts an illustrative embodiment of a system 400 that enables presenting multiple audio content that corresponds to multiple video content 411, 421 being presented by a media processor 406 (e.g., an STB) at a display device 408. System 400 illustrates the display device 408 as a television connected with the media processor 406, however, the presentation of the video and audio content can be at various types of devices, including a mobile phone, a laptop computer, a desktop computer, a vehicle entertainment system, and so forth. System 400 enables multiple users to view multiple video content while also listening to the corresponding audio content for that particular video content. The multiple video content 411, 421 is being presented in a PIP format, however, various other formats and techniques can be utilized, such as side-by-side format, a mosaic of more than two video contents, stereoscopic viewing utilizing synchronized viewing glasses (e.g., shutter glasses 423), and so forth. The exemplary embodiment illustrates two video contents 411, 421 and two corresponding audio contents 412, 422, however, any number of media contents can be presented according to the capabilities of the media processor 406 and/or the display device 408.

In one or more embodiments, system 400 enables a determination (e.g., by the media processor 406) that first and second users 410, 420 desire to watch first and second video content 411, 421, respectively. System 400 further enables a determination (e.g., by the media processor 406) of the locations of the first and second users 410, 420 in a presentation area 409 (e.g., a room) of the display device 408. For example, one or more images 450 can be captured of the presentation area 409. Image pattern recognition can be applied to the image 450 to determine the user locations in the presentation area 409 and/or identify the first and second users in the presentation area.

The media processor 406 can present the first and second video content 411, 421 at the display device 408 during a particular time period and can deliver the corresponding audio content to audio devices 415, 425 (e.g., speakers) that will separately present the audio content. In the illustrated example, speaker 415 can receive audio content corresponding to the video content 411 that user 410 is viewing and speaker 425 can receive the audio content corresponding to the video content 421 that the user 420 is viewing. The routing of the different audio contents 412, 422 to the different audio devices 415, 425 can be based on determining which video content is being watched by which user, such as according to analysis of image 450, user input indicating which content is being watched, eye-tracking, and so forth.

In one or more embodiments, one or more of the audio devices 415, 425 can perform beam-forming (as illustrated by lines 418, 428) for directing sound waves of the audio content(s) to particular locations of the presentation area 409 where the users 410, 420 are situated. The example shows beamforming being performed by audio devices 415, 425, however, the beamforming can be performed by audio device(s) embedded in the display device. In one or more embodiments, the presentation area can be divided into sections (e.g., pre-determined according to one or more of known locations of the audio devices, parameters of the room, obstacles in the room, and so forth) and the beamforming can be directed to those particular sections according to a user being detected in one of those sections. In one or more embodiments, first beamforming for a first audio content can be based on second beamforming(s) being performed for second audio content(s). For example, a directionality of an array can be adjusted when transmitting by controlling the phase and relative amplitude of the sound signal at each transmitter, in order to create a pattern of constructive and destructive interference in the wavefront. The desired pattern can be determined according to patterns being utilized by the second beamforming(s) to avoid or reduce Interference. In one or more embodiments, beamforming of one audio content can be implemented in combination with non-beamforming of another audio content.

In one or more embodiments, one or both of the audio contents 412, 422 can be adjusted to facilitate presentation to the user. For example, the audio content can be adjusted based on a comparison of the media content, such as comparing subject matters of the first and second video content 411, 421. For instance, content that typically is more visual in nature (e.g., sporting events) can be adjusted in one manner while content that typically is more audio in nature (e.g., concert) can be adjusted in another manner, such as raising the volume of the audio-centric content relative to the volume of the video-centric content. Adjustments can be made to ensure that one user can clearly hear the audio content that is audio-centric even if this means that the other user does not hear the audio content for content that is video-centric as clear.

In one embodiment, the subject matter of each of first and second video contents 411, 421 can be determined and can be the basis of the comparison between the first and second video contents for adjusting corresponding audio content. The subject matter can be determined based on various techniques, such as analyzing metadata (e.g., included with a video stream) for the video content that describes the subject matter, accessing titles of the video content, accessing (e.g., locally and/or remotely) summaries of the subject matter.

In one or more embodiments, audio adjustments can be performed based on user preferences, such as indicated in user profiles 475. For example, user 410 can indicate in a user preference that he or she requires a particular adaptation (e.g., a high volume of audio when watching a movie) while user 420 can indicate in a user preference that he or she does not require a particular adaptation (e.g., a high volume of audio when watching sporting events). Based on one or both of these user preferences (e.g., included in user profiles 475 for the users 410, 420 stored by or accessible to the media processor 406), one or both of the audio contents corresponding to video contents 411, 421 can be adjusted. The adjustments to the audio content can be of various types which may or may not include volume adjustments, such as changing audio frequency including selective speech frequency amplification (e.g., a hearing aid implement via the media processor 406).

In one or more embodiments, the determination of which media content a particular user is viewing can be based on user input, such as indicating via a remote controller (or other technique for providing user input) the particular video content being watched and the particular speaker that is being listened to (e.g., speaker 415 or 425).

In one or more embodiments, the presenting of multiple video contents at the display device during a same or overlapping time period can be performed by utilizing viewing devices e.g., viewing glasses 423) that are synchronized to periodic time slots in which the first and second video content are being presented during the same or overlapping time period to enable a first user to view only a first video content and to enable a second user to view only a second video content. In one or more embodiments, the synchronized viewing glasses 423 enable presentation of 2D and/or 3D video content. In one or more embodiments, the viewing glasses 423 can have a transceiver for transmitting and receiving information with the media processor 406, such as synchronization data associated with the periodic time slots, location data for enabling locating of a user wearing the glasses, and so forth.

In one or more embodiments, routing determinations can be based on user preferences, such as where more than one audio device is available for presenting particular audio content. For example, a user can indicate a user preference in a user profile for listening to audio content of sporting events from a single speaker positioned behind the user but can indicate another user preference in the user profile for listening to audio content of movies from multiple speakers in front of the user. In this example, routing determinations can be made based on the type of media content, the availability of audio devices, and the location of the available audio devices relative to the particular user.

In one or more embodiments, routing of audio content can be performed to multiple audio devices. For example, a determination can be made that first and second users at opposite ends of a room are watching a movie while a third user in the middle of the room is watching a sporting event that is presented in a PIP format at a television. A determination can be made to route the audio content for the movie to two different speakers (i.e., first and second speakers) that are at the opposite ends of the rooms in proximity to the first and second users, while routing the audio of the sporting event to a third speaker that is in the middle of the room in proximity to the third user. In one embodiment, the movie audio content can be adjusted differently for the first and second users. For example, a volume of the movie audio content can be raised at the first speaker while a volume of the movie audio content is kept the same at the second speaker, where the first speaker is farther away from the third speaker than is the second speaker. Routing and/or audio adjustment determinations can be made based on facilitating hearing requirements for different users. In one or more embodiments, more than one audio device can be utilized to deliver selected audio content to a particular user, such as utilizing three speakers to deliver surround sound to a first user who is watching a concert on a display device and utilizing a single fourth speaker to deliver audio content of a basketball game to a second user who is watching the basketball game on the same display device.

Figure 5:
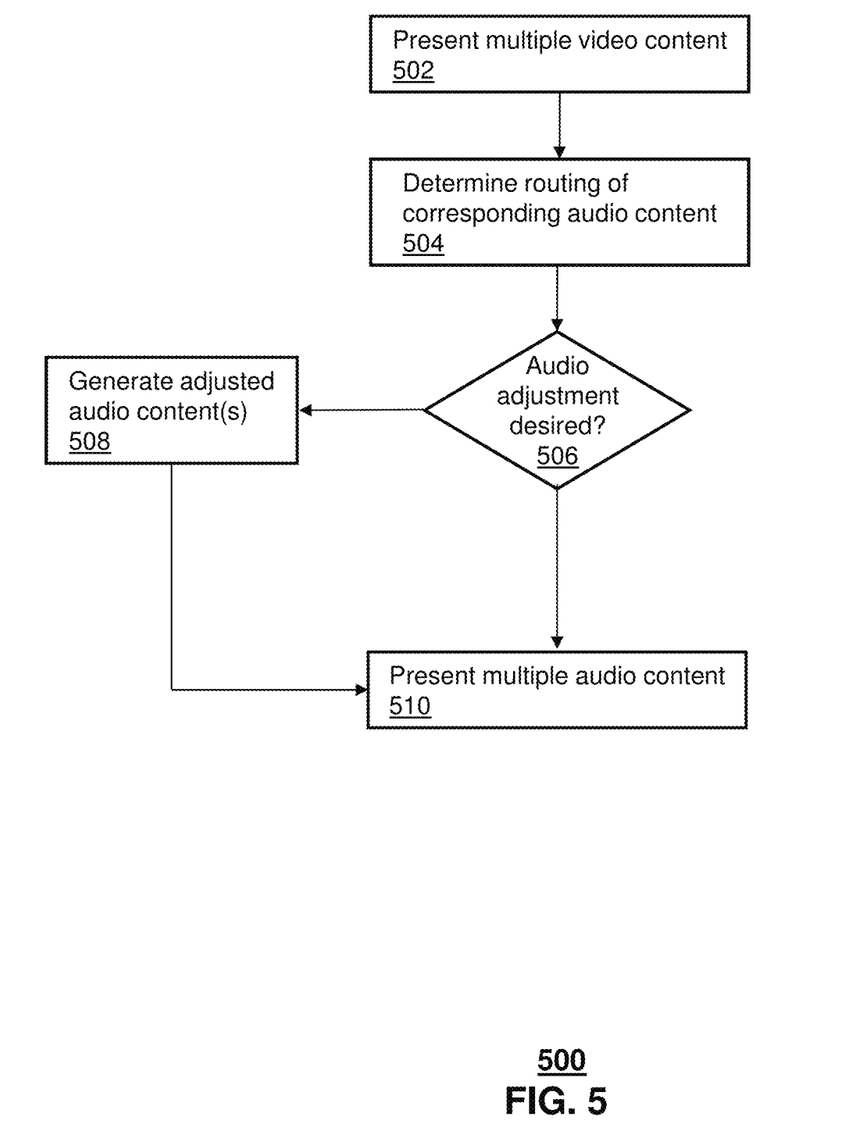
FIG. 5 depicts an illustrative embodiment of a method operating in the system of FIG. 4.

FIG. 5 depicts an illustrative embodiment of a method 500 that can be used by systems 100 and/or 400 for selectively presenting multiple audio content to users. Method 500 can be performed by a media processor (e.g., STB 106 or 406) or can be performed by another device, such as an end user device or a network device or a combination thereof. At 502, a determination can be made as to what media content is to be presented to particular users, and the corresponding first and second video contents can be presented at a display device during a particular time period. The presentation can be in various formats including PIP format, side-by-side format, a mosaic of more than two video contents, stereoscopic viewing utilizing synchronized viewing glasses (e.g., shutter glasses), and so forth.

At 504, routing determinations can be made for audio content of the media content. The routing determinations can be made based on various information and utilizing various techniques, such as receiving user input (e.g., indicating routing instructions), determining user location (e.g., based on capturing an image and applying pattern recognition), determining parameters to be applied in beamforming (e.g., to deliver selected audio content to a particular geographic area within a room), identifying audio device capabilities and parameters (e.g., direction a speaker is facing, power of a speaker, beamforming capability, identifying obstacles between a speaker and a user, distance between user and speaker, acoustics of presentation area such as size of a room, and so forth), determining user preferences (e.g., a user prefers sound to be delivered from behind the user), and so forth.

At 506, a determination can be made if audio content adjustment(s) are desired. In one embodiment, this determination can be made according to various factors or combinations of factors such as user preferences, types of media content, types of audio devices, time of day, and so forth. For example, audio content can be adjusted based on a comparison of the media content, such as increasing volume of audio-centric media content relative to the volume of video-centric media content. In another example, audio content can be adjusted based on user profile(s) of the user(s) which can be stored locally (e.g., at the media processor 106 or 406) and/or can be stored remotely (e.g., at a network server). In one embodiment, a combination of user profiles and a comparison of the media content can be utilized for determining whether audio content adjustment is desired.

If audio content adjustment of one or more of the audio contents is desired then at 508 the particular audio adjustment can be performed. In one embodiment, the audio content adjustment can be performed by the media processor 106 or 406 and/or by the display device 108 or 408, such as a volume adjustment or an audio frequency adjustment. In another embodiment, the audio content adjustment can be performed remotely by a network server, such as adjusting an audio frequency of speech in audio content at the network server according to a user profile indicating particular frequencies that are difficult for the user to hear and/or indicating frequencies that are more easily heard by the user and then delivering the adjusted audio content from the network server to the media processor 106 or 406. At 510, the audio contents (and/or adjusted audio contents) can be delivered to the selected audio devices according to the routing determinations.

In one embodiment, the determining the media content associated with the first and second users can be based on user input, such as entering information (which may or may not include routing instructions) via GUI 300. In one embodiment, the comparison of the media content can include comparing categories of subject matter of the media content, such as sports, action movies, dramatic movies, concerts, comedy movies, and so forth.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein and/or additional blocks having additional features may be added to method 500.

Figure 6:
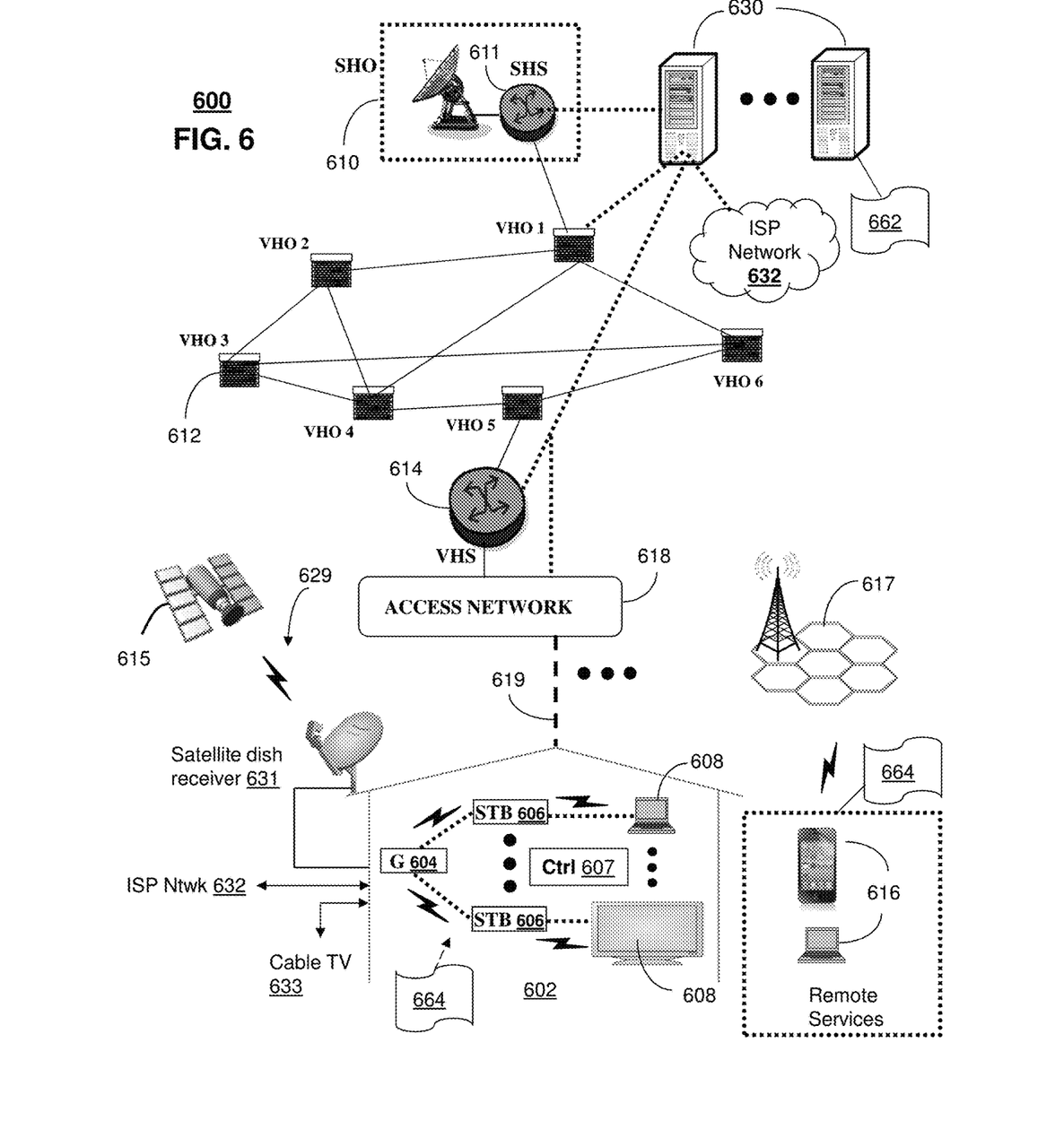
FIG. 6 depicts an illustrative embodiment of a communication system that provides media services including presentation of multiple audio content.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system and/or a satellite television system). Communication system 600 can be overlaid or operably coupled with systems 100 and/or 400 of FIGS. 1 and/or 4 as another representative embodiment of communication system 600. For instance, one or more devices illustrated in the communication system 600 of FIG. 6 can present multiple audio content to multiple users, such as where multiple video content is being presented at a single display device. For example, system 600 enables identifying first and second users and first and second locations of the first and second users in a presentation area; determining first and second media content associated with the first and second users, respectively, where the first media content includes first audio content and first video content, and where the second media content includes second audio content; presenting the first video content at a display device during a particular time period; adjusting the first audio content resulting in adjusted first audio content; presenting the adjusted first audio content directed to the first location during the particular time period; and presenting the second audio content directed to the second location during the particular time period. In one or more embodiments, system 600 enables the adjusting the first audio content to be based on a comparison of the first and second media content. In one or more embodiments, system 600 enables the adjusting the first audio content to be based on a user profile of the first user. In one or more embodiments, system 600 enables the adjusting the first audio content to be one of adjusting a volume of the first audio content relative to the second audio content, adjusting a frequency associated with the first audio content, or a combination thereof. In one or more embodiments, system 600 enables the identifying the first and second users and the first and second locations by capturing an image of the presentation area associated with the display device, where the image includes the first and second users. In one or more embodiments, system 600 enables the presenting the adjusted first audio content directed to the first location by performing beamforming via an audio device that emits the adjusted first audio content.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as STBs which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as an audio adjustment server (herein referred to as server 630). The server 630 can use computing and communication technology to perform function 662, which can include among other things, adjusting audio content (e.g., frequency adjustment, volume adjustment, and so forth) according to various factors (e.g., user preferences, comparison of media content, predicted interference between audio content, and so forth). The adjusted audio content can then be delivered for presentation at an audio device while other audio content is being presented by another audio device. The media processors 606 and wireless communication devices 616 can be provisioned with software function 664. For instance, function 664 can be similar to the functions described for the media processors 106 or 406 of FIG. 1 or 4 in accordance with method 500. For instance, function 664 can include one or more of capturing an image of a presentation area associated with a display device where the image includes first and second users; identifying the first and second users and first and second locations of the first and second users in the presentation area according to the image; determining first and second media content associated with the first and second users, respectively, where the first and second media content includes first and second audio and video content, respectively; presenting the first and second video content at the display device during a particular time period; adjusting the first audio content according to a comparison of subject matter associated with the first and second media content resulting in adjusted first audio content; presenting the adjusted first audio content directed to the first location during the particular time period; and presenting the second audio content directed to the second location during the particular time period.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
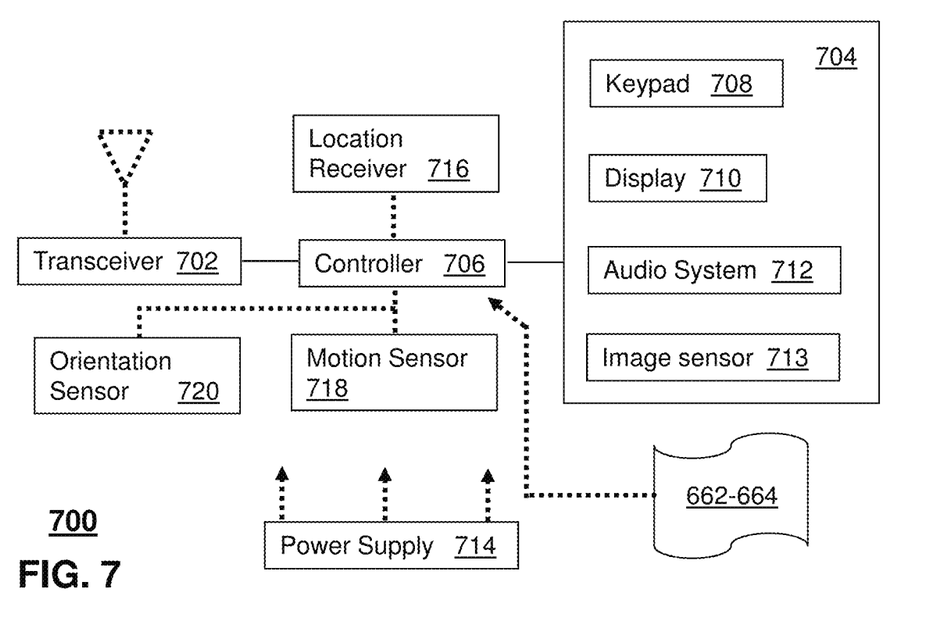
FIG. 7 depicts an illustrative embodiment of a communication device that facilitates presentation of multiple audio content.

FIG. 7 depicts an illustrative embodiment of a communication device 700. Communication device 700 can serve in whole or in part as an illustrative embodiment of the devices depicted in systems 100, 400 and/or 600 and can be configured to perform all or portions of method 500 of FIG. 5. For example, communication device 700 can identify users and their locations in a presentation area; determine media contents to be presented to these users; present video content(s) at a display device during a particular time period; adjust corresponding audio content(s) resulting in adjusted audio content(s); and present audio content(s) and/or adjusted audio content(s) directed to particular locations of particular users during the particular time period.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the devices of systems 100, 400, 600. It will be appreciated that the communication device 700 can also represent other devices that can operate in systems 100, 400, 600 such as a gaming console and a media player. In addition, the controller 706 can be adapted in various embodiments to perform the functions 662-664.

Upon reviewing the aforementioned embodiments, it would be evident to an artisan with ordinary skill in the art that said embodiments can be modified, reduced, or enhanced without departing from the scope of the claims described below. For example, adjustments to audio content can be based on other factors, such as translating speech into a different language which is indicated as a user preference for a particular user. In one or more embodiments, weighting can be applied to factors or other information in determining audio adjustments and/or routing decisions, such as weighting a known hearing impairment of a first user over a desire of a second user to hear commentators of a sports program. In this example, a volume of audio content being presented to the first user may be raised relative to a volume of the audio content of the second user.

In one or more embodiments, historical consumption information can be monitored, stored and accessed for determining audio adjustments, such as determining that a first user historically decreases volume when tuned to a channel presenting sporting events. In this example, the historical information can be utilized to determine that a volume of audio content being presented to a second user may be raised relative to a volume of the audio content of the first user where the first user is watching an auto race. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or or wired paths that utilize one or more of various protocols or methodologies, where the coupling and/or connection can be direct (e.g., no intervening processing device) and/or indirect (e.g., an intermediary processing device such as a router).

Figure 8:
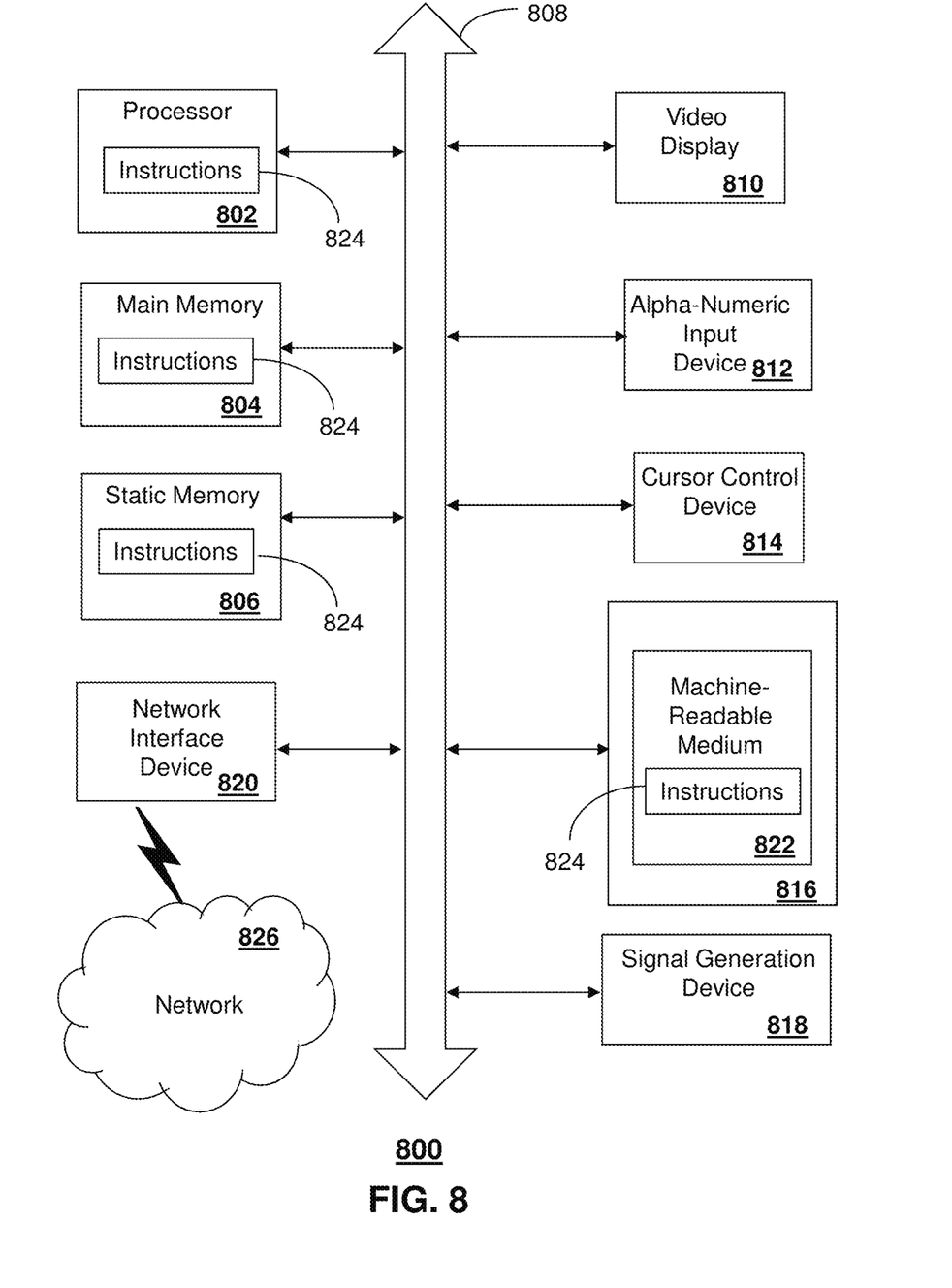
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 630, the media processor 106, 406, 606 and other devices associated with FIGS. 1-7 to deliver multiple audio content to users, such as by adjusting one or more of the audio contents to facilitate hearing by the user(s). In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   presenting, by a processing system including a processor, during a time period and via a display device, first video content associated with first media content and second video content associated with second media content;
   determining, by the processing system, based upon a first title of the first video content a first subject matter of the first video content;
   determining, by the processing system, based upon a second title of the second video content a second subject matter of the second video content;
   comparing, by the processing system, the first subject matter of the first video content and the second subject matter of the second video content, the comparing resulting in a comparison;
   selecting, by the processing system, at least one parameter for a first beamforming of first audio content associated with the first media content resulting in a first beam pattern that is different from a second beam pattern of a second beamforming of second audio content associated with the second media content, the at least one parameter being selected based upon the comparison in order to facilitate adjusting relative volumes of the first audio content and the second audio content during the time period;
   presenting, by the processing system, via a first audio device, the first audio content configured according to the first beam pattern specified by the at least one parameter and directed to a first location during the time period; and
   presenting, by the processing system, via a second audio device, the second audio content configured according to the second beam pattern and directed to a second location during the time period,
   wherein the at least one parameter comprises an identification of a direction that the first audio device is facing, a power of the first audio device, an identification of an obstacle between the first audio device and a first user, a distance between the first audio device and the first user, an acoustic characteristic of a room where the first audio device is located, or any combination thereof.

2. The method of claim 1, further comprising:
   determining, by the processing system, the first location according to a first position of the first user, wherein the first user is associated with the first media content; and
   determining, by the processing system, the second location according to a second position of a second user, wherein the second user is associated with the second media content.

3. The method of claim 2, further comprising identifying, by the processing system, the first user and the second user.

4. The method of claim 1, further comprising determining, by the processing system, a first user preference of the first user, wherein the first user is associated with the first media content, and wherein the selecting of the at least one parameter for the first beamforming is further according to the first user preference.

5. The method of claim 4, wherein the first user preference is included in a first user profile of the first user.

6. The method of claim 1, wherein the first audio device and the second audio device are separate devices.

7. The method of claim 1, wherein the at least one parameter for the first beamforming of the first audio content further comprises a setting for frequency associated with the first audio content.

8. The method of claim 1, further comprising receiving, by the processing system, a user selection associated with the first media content.

9. The method of claim 1, wherein the first subject matter of the first video content and the second subject matter of the second video content are further determined based upon an analysis of metadata.

10. The method of claim 1, wherein the at least one parameter comprises the identification of the direction that the first audio device is facing, the power of the first audio device, the identification of the obstacle between the first audio device and the first user, the distance between the first audio device and the first user, and the acoustic characteristic of the room where the first audio device is located.

11. A non-transitory, machine-readable storage medium of a beamforming apparatus, comprising executable instructions that, when executed by a processing system including a processor, facilitate performance of operations, the operations comprising:
   receiving, from a media processor device, first audio content associated with first media content and second audio content associated with second media content;
   determining, based upon a first title of the first media content, a first subject matter of the first media content;
   determining, based upon a second title of the second media content, a second subject matter of the second media content;
   receiving, from the media processor device, at least one parameter for a first beamforming of the first audio content, the at least one parameter being selected based upon a comparison of the first subject matter of the first media content and the second subject matter of the second media content in order to facilitate adjusting relative volumes of the first audio content and the second audio content during a time period; and presenting the first audio content via the first beamforming and via a first audio device according to the at least one parameter, the presenting of the first audio content generating a first beam pattern directed to a first location during the time period, and presenting the second audio content via a second beamforming that generates a second beam pattern that is directed to a second location during the time period,
wherein the at least one parameter comprises an identification of a direction that the first audio device is facing, a power of the first audio device, an identification of an obstacle between the first audio device and a first user, a distance between the first audio device and the first user, an acoustic characteristic of a room where the first audio device is located, or any combination thereof.

12. The non-transitory, machine-readable storage medium of claim 11, wherein the at least one parameter for the first beamforming is further selected according to a first user preference associated with the first user, and wherein the first user is associated with the first media content.

13. The non-transitory, machine-readable storage medium of claim 12, wherein the first user preference is included in a first user profile of the first user.

14. The non-transitory, machine-readable storage medium of claim 12, wherein the media processor device determines that the first user is positioned at the first location.

15. The non-transitory, machine-readable storage medium of claim 11, wherein the at least one parameter for the first beamforming of the first audio content further comprises a setting for frequency associated with the first audio content.

16. The non-transitory, machine-readable storage medium of claim 11, wherein the first subject matter of the first media content and the second subject matter of the second media content are further determined based upon an analysis of metadata.

17. The non-transitory, machine-readable storage medium of claim 11, wherein the at least one parameter comprises the identification of the direction that the first audio device is facing, the power of the first audio device, the identification of the obstacle between the first audio device and the first user, the distance between the first audio device and the first user, and the acoustic characteristic of the room where the first audio device is located.

18. A media processor device, comprising:
a processing system including a processor; and
a memory that stores executable instructions that, when executed by the processing system, facilitate performance of operations, the operations comprising:
presenting during a time period, via a display device, first video content associated with first media content;
presenting during the time period, via the display device, second video content associated with second media content;
determining, based upon a first title of the first video content, a first subject matter of the first video content;
determining, based upon a second title of the second video content, a second subject matter of the second video content;
comparing the first subject matter of the first video content and the second subject matter of the second video content, resulting in a comparison;
selecting at least one parameter for a first beamforming of first audio content associated with the first media content resulting in a first beam pattern, the selecting of the at least one parameter for the first beamforming being based upon the comparison and the selecting facilitating an adjusting during the time period of relative volumes of the first audio content and a second audio content associated with the second media content;
presenting, via a first audio device, the first audio content configured according to the first beam pattern specified by the at least one parameter and directed to a first location during the time period; and
presenting, via a second audio device, the second audio content by a second beamforming of a second beam pattern directed to a second location during the time period,
wherein the at least one parameter comprises an identification of a direction that the first audio device is facing, a power of the first audio device, an identification of an obstacle between the first audio device and a first user, a distance between the first audio device and the first user, an acoustic characteristic of a room where the first audio device is located, or any combination thereof.

19. The media processor device of claim 18, wherein the first subject matter of the first video content and the second subject matter of the second video content are further determined based upon an analysis of metadata.

20. The media processor device of claim 18, wherein the at least one parameter comprises at least two of: the identification of the direction that the first audio device is facing, the power of the first audio device, the identification of the obstacle between the first audio device and the first user, the distance between the first audio device and the first user, and the acoustic characteristic of the room where the first audio device is located.

* * * * *